3,740,247
HEAT INSULATION FOR MACHINE PARTS
Friedrich Schweigert, Nuremberg, and Peter Schroder, Erlangen, Germany, assignors to Siemens Aktiengesellschaft, Berlin and Munich, Germany
Filed May 18, 1970, Ser. No. 38,101
Claims priority, application Germany, June 7, 1969, P 19 29 027.8
Int. Cl. B32b 17/04
U.S. Cl. 117—8     2 Claims

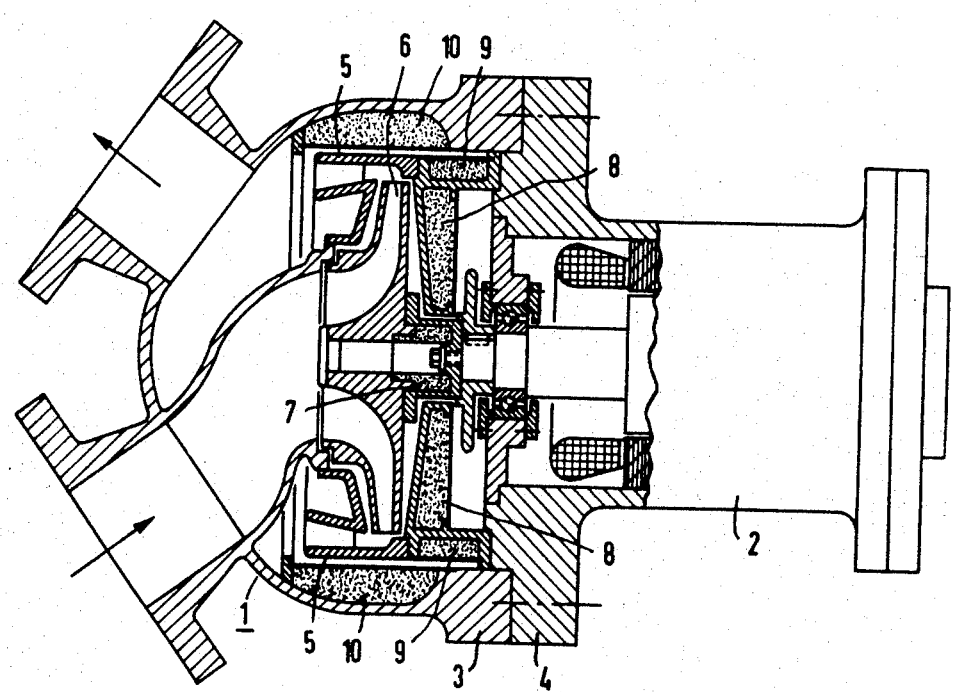

ABSTRACT OF THE DISCLOSURE

Insulating bodies of glass wool or rock wool are adjusted to the shape of machine parts which they are to insulate. The fibers of the insulating bodies are coated with a heat resistant and permanently elastic binder and are connected to each other with the binder. The entire mass of insulating bodies is coated with a layer of the binder and openings are provided in the layer for pressure balance.

DESCRIPTION OF THE INVENTION

The invention relates to heat insulation for machine parts. More particularly, the invention relates to heat insulation for machine parts of nuclear reactor installations. The heat insulation is heat resistant and resistant to pressure variations and is wear resistant.

It is known to use glass wool and rock wool for heat insulation. The glass wool or rock wool is pressed into plates or other configurations. The insulation includes a small percentage, approximately two to three percent, of organic binders. The organic binders dissociate at temperatures above 100° to 120° C. Usually, such insulation is wrapped in a sheet. It is not possible, however, to prevent the heat stress from dissolving the binder or to prevent vibration phenomena from destroying the fibers. The dissolution of the binder and the destruction of the fibers results in dust. Although dust is generally acceptable, it is not acceptable in a nuclear reactor installation. In nuclear reactor installations, the machine insulation must be accessible and controllable and may not contain dust, or the like, since dust, or the like, would result in difficulties in the highly-sensitive sealing members such as, for example, the seals of cooling ducts.

A concentration or deposit of dust or similar particles within the cycles of nuclear reactors must be prevented with reliability. It is therefore important to provide heat insulation which will not be damaged by the stress created by temperature variations or by the stress created by pressure variations, which temperature and pressure variations are sometimes unavoidable in nuclear reactor installations. In other words, an absolutely dust-free operation must be guaranteed.

The principal object of the invention is to provide new and improved heat insulation for machine parts and a new and improved method of producing heat insulation.

An object of the invention is to provide heat insulation for machine parts which is wear resistant.

An object of the invention is to provide heat insulation for machine parts, which heat insulation is able to withstand temperature variations and pressure variations.

An object of the invention is to provide heat insulation for machine parts of a nuclear reactor installation subject to mechanical vibrations.

An object of the invention is to provide heat insulation for machine parts, which heat insulation is reliable, efficient and effective and does not dissociate to dust under the conditions of operation of a nuclear reactor installation.

An object of the invention is to provide a method of producing heat insulation which is efficient, effective, and reliable and does not dissociate to dust under the conditions of operation of a nuclear reactor installation.

In accordance with the invention, a method of producing heat insulation for machine parts, which heat insulation is wear resistant and able to withstand heat and pressure variations and is adaptable for use in a nuclear reactor installation subject to mechanical vibrations, comprises the steps of preparing insulating bodies of glass wool or rock wool, adjusting the fibers of insulating bodies of glass wool or rock wool to the shape of the machine parts, coating the fibers of the insulating bodies with a heat resistant and permanently elastic binder, connecting the fibers of the insulating bodies to each other with the binder, coating the entire mass of insulating bodies with a layer of the binder, and providing openings in the binder layer for pressure balance.

The insulating bodies are saturated with the binder and are subsequently dried. The binder is applied to the fibers of the insulating bodies during the preparation of the insulating bodies. The fibers of the insulating bodies are coated with a fiber of thinned silicon rubber.

In accordance with the invention, heat insulation for machine parts adaptable for use in a nuclear reactor installation subject to mechanical vibrations comprises insulating bodies of glass wool or rock wool adjusted to the shape of the machine parts. The insulating bodies have fibers coated with a heat resistant and permanently elastic binder and are connected to each other by the binder. A layer of the binder coats the entire mass of the insulating bodies and has openings provided therein for pressure balance.

The binder comprises silicon rubber which may be thinned with benzine.

In order that the invention may be readily carried into effect, it will now be described with reference to the accompanying drawing, wherein the single figure is a cutaway view of an embodiment of machine parts of a nuclear reactor installation, illustrating the heat insulation of the invention.

The figure illustrates a section through a $CO_2$ blower of a nuclear reactor, cooled by gas. A blower 1 and a driving motor 2 are shown. The housings of the blower 1 and driving motor 2 are joined together at their flange areas 3 and 4, respectively. The direction of the circulating gas is indicated by the arrows.

The actual circulation of gas is provided by the rotation of a fan wheel 6 and the gas is drawn in through a diffuser 5 which is firmly affixed to the housing of the blower 1. The speed of rotation of the fan wheel 6 of the blower is 3000 r.p.m. The operating pressure may fluctuate between 1 and 70 atmospheres. The operating temperature is between 50 and 100° C., but may reach 300° C. for a period of several hours.

It is vital that the operating temperatures of the circulating gas influence the driving motor 2 as little as possible. This could be accomplished, for example, by special cooling of the housing portions. For reasons of operating safety and simplicity, however, such cooling is dispensed with in a nuclear reactor installation, and heat insulation is provided in the form of shaped, adjusted or molded heat insulating bodies 7, 8, 9 and 10.

The heat insulating bodies 7, 8, 9 and 10 accommodated in appropriately formed pockets or spaces of the housing of the blower 1. The pockets or spaces accommodating the insulating bodies are provided with removable covers. The blower 1, which may be utilized, for example, as the blower of a charging machine, is exposed to vibrations. The vibrations must be withstood by the heat insulation to an extent whereby there is no development of dust particles, or the like, and no dust particles, or the like, are fed into the gas stream. This is highly essential, since if dust enters the gas stream, it may enter the sensitive parts of the nuclear reactor cycle system. The individual fibers of glass wool or rock wool are coated with a highly elastic binding agent. This assures that the individual fibers will retain their body mechanically and will not dissolve as dust, even during breakage of individual ones of said fibers. The fibers may be coated with the binder by saturation of compressed insulating bodies of glass wool or rock wool.

After the insulating bodies have been impregnated with the synthetic resin binder, it is necessary to destroy the binder first, by heating to a temperature of about 150° C. It is preferable, for the production of insulating bodies, to initially provide a highly elastic binder, instead of an initial synthetic binder, since this provides a more uniform binding of the individual fibers to each other.

A suitable binder, which may withstand a permanent temperature of 200° C., and is not impaired, even during short term heating up to 300° C., is silicon rubber. It is particularly preferable to utilize sparsely filled masses, due to the fact that, under certain conditions, glass fiber or rock wool packing acts like a filter during saturation and holds the filling back. The danger of clogging associated therewith may jeopardize the quality of the saturated insulating bodies.

Since a silicon rubber mass is normally relatively tough, such a mass is preferably thinned prior to its processing, with a relatively volatile agent or agents. A suitable thinning agent may comprise, for example, a chlorinated hydrocarbon such as, for example, toluol, xylol, benzol and benzine. The most practical thinning ratio of volume shares, depending upon the structure and strength of the insulating bodies, is 1:3 to 1:5.

In order to permit the solvent to escape as rapidly as possible from insulating bodies saturated therewith, it is preferable to dry said insulating bodies on a wire net having rough meshes, at a temperature of 40 to 50° C. Higher temperatures are to be avoided, since they may lead to a formation of bubbles, due to the evaporation of the solvent, which occurs too rapidly.

Moreover, it is advantageous to provide the dried insulating bodies, which have been saturated with silicon rubber, with a silicon rubber jacket or layer, so that a direct contact between the fibers and the housing of the machine parts is prevented. Furthermore, sectional edges should be immediately covered, sheathed or encased. The covering of the sectional edges is best provided by coating with an unthinned silicon rubber such as, for example, a siloprene paste, or by injection with silicon rubber having approximately 10 percent thinning. After the silicon rubber has hardened, the casing is provided with fine holes at various locations, so that there may be pressure balance during a pressure load, without damage to the insulating bodies.

In tests undertaken under conditions approaching actual operating conditions, it has been observed that insulating bodies produced in accordance with the method of the invention meet the requirements completely and adequately. Furthermore, tests for over-heating have been conducted at 300° C., for up to 50 hours, and have caused no damage. This attests to the suitablity of the heat insulation of the invention produced by the method of the invention.

While the invention has been described by means of a specific example and in a specific embodiment, we do not wish to be limited thereto, for obvious modifications will occur to those skilled in the art without departing from the spirit and scope of the invention.

We claim:

1. A method of producing heat insulation for machine parts, said heat insulation being wear resistant and able to withstand heat and pressure variations and being adaptable for use in a nuclear reactor installation subject to mechanical vibrations, said method comprising the steps of preparing insulating bodies of glass wool or rock wool;

adjusting the fibers of insulating bodies of glass wool or rock wool to the shape of the machine parts;

saturating the fibers of the insulating bodies with a heat resistant and permanently elastic binder of solvent thinned silicon rubber thereby connecting the fibers of the insulating bodies to each other with the binder; thereafter drying to evaporate the solvent;

coating the entire mass of insulating bodies with an outer layer of a silicone rubber to prevent the escape of fibers from the mass; and providing openings in said outer layer for pressure balance.

2. A method as claimed in claim 1, wherein the binder is applied to the fibers of the insulating bodies during the preparation of said insulating bodies.

References Cited

UNITED STATES PATENTS

| 3,070,559 | 12/1962 | Nitsche et al. | 117—126 GS |
| 3,472,668 | 10/1969 | Pfeifer et al. | 117—126 GB |
| 3,013,937 | 12/1961 | Brown et al. | 117—11 |
| 3,427,189 | 2/1969 | Brechna | 117—126 GS |

FOREIGN PATENTS

| 752,658 | 7/1956 | Great Britain | 117—161 ZA |

MURRAY KATZ, Primary Examiner

D. COHEN, Assistant Examiner

U.S. Cl. X.R.

117—72, 126 GS, 140 A; 161—109, 170